(12) United States Patent
Takahashi et al.

(10) Patent No.: US 6,297,609 B1
(45) Date of Patent: Oct. 2, 2001

(54) OBSTRUCTION DETECTING METHOD FOR THE USE IN POWER WINDOW APPARATUS, AND POWER WINDOW APPARATUS

(75) Inventors: Jun Takahashi; Akira Sasaki, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/471,838

(22) Filed: Dec. 23, 1999

(30) Foreign Application Priority Data

Dec. 28, 1998 (JP) .................................. 10-374218

(51) Int. Cl.[7] .................................................. H02P 7/00
(52) U.S. Cl. ........................... 318/484; 318/465; 318/283
(58) Field of Search ............................... 318/484, 465, 318/283

(56) References Cited

U.S. PATENT DOCUMENTS 5,334,876 * 8/1994 Washeleski et al. ............ 307/10.1
5,994,858 * 11/1999 Miura ............................. 318/283
6,064,165 * 5/2000 Boisvert et al. ................. 318/465

* cited by examiner

Primary Examiner—Robert E. Nappi
Assistant Examiner—Rita Leykin
(74) Attorney, Agent, or Firm—Brinks Hofer Gilson & Lione

(57) ABSTRACT

An pinching detecting method for use in a power window apparatus, capable of preventing a malfunction even if a normal pulse edge interval is unobtainable, and of preventing a force exceeding a reference value from acting on an object pinched into a window. The power window apparatus is made up of a window opening and closing motor, a motor driving section, a pulse generator, a micro control unit and a switch device, and a timer is incorporated into the micro control unit. The micro control unit obtains a corresponding pinching decision time from a reference value at that time whenever a pulse edge of pulses outputted from the pulse generator arrives at the micro control unit and updates a set time of the timer. If one pulse edge arrives but the next pulse edge does not arrive after the elapse of the pinching decision time, the micro control unit ceases a decision on the occurrence/no occurrence of the pinching in the window and stops the drive of the motor or drives the motor in the reverse direction. The calculation of the pinching decision time is made on the basis of k1 and k2 tables stored in a memory of the micro control unit.

10 Claims, 7 Drawing Sheets

OBSTRUCTION DETECTING METHOD FOR THE USE IN POWER WINDOW APPARATUS, AND POWER WINDOW APPARATUS

BACKGROUND OF THE INVENTION

1. Field of the Invention

The present invention relates to an obstruction detecting method for use in a power window apparatus and a power window apparatus. More particularly the invention relates to an obstruction detecting method for use in a power window apparatus and a power window apparatus, capable of preventing an excessive pinching force from acting on an object pinched or caught in a power window, even in a case of cessation of a supply of two phase pulses (a two-phase pulse signal) from a pulse generating section coupled to a window opening and closing motor.

2. Description of the Related Art

Among power window apparatus which have been previously employed for opening and closing a window of a motor vehicle, there has been known a power window apparatus which detects the pinching of an object in the window, and for stopping or reversing the window opening and closing motor at the detection thereof.

In this type, a conventional power window apparatus is made up of, at a minimum, a motor for opening and closing a window, a motor driving section for driving the motor rotationally, a pulse generator for generating a pulse in the rotation of the motor, a micro control unit (MCU) for controlling the entire operation of the apparatus, and operating switches for opening/closing the window manually.

In the aforesaid conventional power window apparatus made to detect the obstruction, in response to an operation of any one of the operating switches, the micro control unit supplies a drive signal through the motor driving section to the motor to rotate the motor in the forward direction or in the reverse direction in accordance with the switch operation so that the window is driven in the opening direction or in the closing direction. On the rotation of the motor, the pulse generator coupled to the motor operates to output a pulse signal comprising pulses. At this time, the micro control unit calculates the interval between the edges of the pulse signal outputted from the pulse generator by counting a clock signal to obtain a motor torque value on the basis of the calculated pulse edge interval. This is used for comparing the obtained motor torque value with a reference median stored previously in its internal memory. If the motor torque value exceeds the reference median by a substantial amount, the micro control unit makes a decision that a pinching in the window has occurred, and immediately stops or reverses the rotation thereof.

Thus, the conventional power window apparatus and obstruction detection apparatus is designed such that the motor torque value is obtained on the basis of the pulse edge interval of two phase pulses outputted from the pulse generator to compare the motor torque value with a reference median, thereby making a decision on the occurrence/no occurrence of the pinching in the window.

However, the aforesaid power window apparatus creates the following problem. That is, since the decision on occurrence/no occurrence of the pinching therein is made after the detection of the pulse edges of pulses outputted from the pulse generator, in the case in which the motor is locked abruptly because a high-rigidity object is pinched in the window, the micro control unit cannot detect the pulse edges of the output pulses of the pulse generator so that difficulty is encountered in obtaining the pulse edge interval in the micro control unit, which leads to the difficulty of obtaining the motor torque value on the basis of the pulse edge interval. This causes a pinching force exceeding a reference value (a value calculated by adding a preset reference allowable value to the reference median) to act on the object pinched.

In addition, in the case of the aforesaid power window apparatus, there arises problem if there is no output of a pulse signal from the pulse generator or no transmission of the pulse signal to the micro control unit. For example, if a magnetic sensor built in the pulse generator gets out of order, if a cable for leading the pulse from the magnetic sensor to the micro control unit breaks down, or if a breakage or a contact failure of a cable connector installed on the pulse generator side or on the micro control unit side occurs. If the pulse signal outputted from the pulse generator does not reach the micro control unit at all, difficulty is experienced in calculating the pulse edge interval in the micro control unit so that the motor torque value is unobtainable on the basis of the pulse edge interval. Hence, if the pinching into the window occurs during this time, the detection thereof becomes impossible. Still additionally, in the case in which the pulse generator generates two phase pulses, if only the one phase pulse of the two phase pulses does not reach the micro control unit, although the micro control unit can obtain the pulse edge interval, the obtained pulse edge interval doubles approximately to the intended pulse edge interval and, accordingly, the motor torque value based on the pulse edge interval also doubles approximately so that, irrespective of no occurrence of the pinching into the window, a false detection representative of the occurrence pinching therein takes place.

SUMMARY OF THE INVENTION

Accordingly, the present invention has been developed in view of such problems, and it is an object of the invention to provide an obstruction detecting method and a power window apparatus capable of preventing a pinching force exceeding a reference value from acting on an object pinched and of avoiding the occurrence of a malfunction even when a pulse edge interval of pulses to be outputted from a pulse generator is unobtainable.

In accordance with this invention, there is provided an obstruction detecting method and a power window apparatus comprising a motor for opening and closing a window through the use of a window driving mechanism, a motor driving section for driving the motor, a pulse generating section for generating pulses in connection with the rotation of the motor, a micro control unit for conducting the entire control and drive processing, a timer and a switch device for conducting opening and closing operations of the window manually, wherein the micro control unit obtains a corresponding obstruction decision time from a reference value based upon a characteristic value of the motor to update a time to be set in the timer whenever a pulse edge of the pulses enters the micro control unit and, when one pulse edge of the pulses arrives but the next pulse edge does not arrive before the elapse of the pinching decision as time set in the timer, makes a decision to the occurrence of an pinching in the window to stop the drive of the motor or rotate the motor in the reverse direction.

With this configuration, since the pinching decision time calculated from the reference value is set in the timer incorporated into the micro control unit whenever one pulse edge of a pulse signal outputted from the pulse generator arrives at the micro control unit, for example, even in the case in which the motor is locked suddenly because a high-rigidity object is pinched in the window so that the next pulse edge does not arrive at the micro control unit, at the elapse of the pinching decision time set in the timer, that is, at the time that an external force corresponding to the reference value based upon the motor characteristic value acts on the pinched object, the drive of the motor is ceased or the motor is driven in the reverse direction, which accordingly prevents an external force exceeding a force corresponding to the reference value based upon the motor characteristic value from working on the pinched object.

In addition, since the pinching decision time to be calculated from the reference value becomes slightly longer than the pulse edge interval of the pulse signal outputted from the pulse generator in a state of no occurrence of pinching, when one pulse edge comes therein to enable the setting of the pinching decision time and the next pulse edge arrives (is detected) within the pinching decision time, the timer is reset in response to that next pulse edge and the next pinching decision time is set therein, which permits the continuous pinching detection in the power window apparatus.

Moreover, in the case where some breakdown or trouble arises in a transmission system of the pulse signal from the pulse generator to the micro control unit so that the pulse signal does not arrive at the micro control unit at all, or in the case in which only one phase pulse of the two phase pulses does not reach the micro control unit, the set time in the timer is placed into the time-up condition to cease the decision on the occurrence/no occurrence of pinching into the window for stopping the drive of the motor or for driving the motor in the reverse direction; therefore, an erroneous decision is preventable.

Moreover, the aforesaid motor characteristic value can be calculated on the basis of the pulse edge interval of the pulses. Accordingly, the apparatus becomes simple because both determination of the window position and decision on the pinching depend upon the pulse signal.

Furthermore, the foregoing pinching decision time is obtainable according to the following reduction (conversion) equation in the case in which the motor characteristic value is a motor torque value.

$$T_A = Kt \cdot Ke / \{(Kt \cdot E) - Rm \cdot A\}$$

where $T_A$ represents a pinching decision time;

Kt designates a motor torque constant;

Ke depicts a motor power-generation constant;

E denotes a motor drive voltage;

Rm signifies a motor wirewound resistance; and

A indicates a reference value.

In the above equation, although the motor drive voltage E is measurable whenever a pulse edge of the pulses outputted from the pulse generator arrives at the micro control unit or is measurable intermittently when needed, for enhancing the calculation accuracy, it is most desirable to measure the motor drive voltage E whenever each pulse edge reaches the micro control unit.

Moreover, although the reference median of the motor torque is attainable on the basis of the motor drive voltage the micro control unit measures while the reference value of the motor torque at the pinching decision is calculable by adding a predetermined reference allowable value to the aforesaid reference median, for facilitating the calculation of the reference value, it is preferable that the micro control unit updates the reference median to be stored in a reference median storing area of a memory through learning at every calculation.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

An embodiment of the present invention will be described hereinbelow with reference to the drawings.

Figure 1:
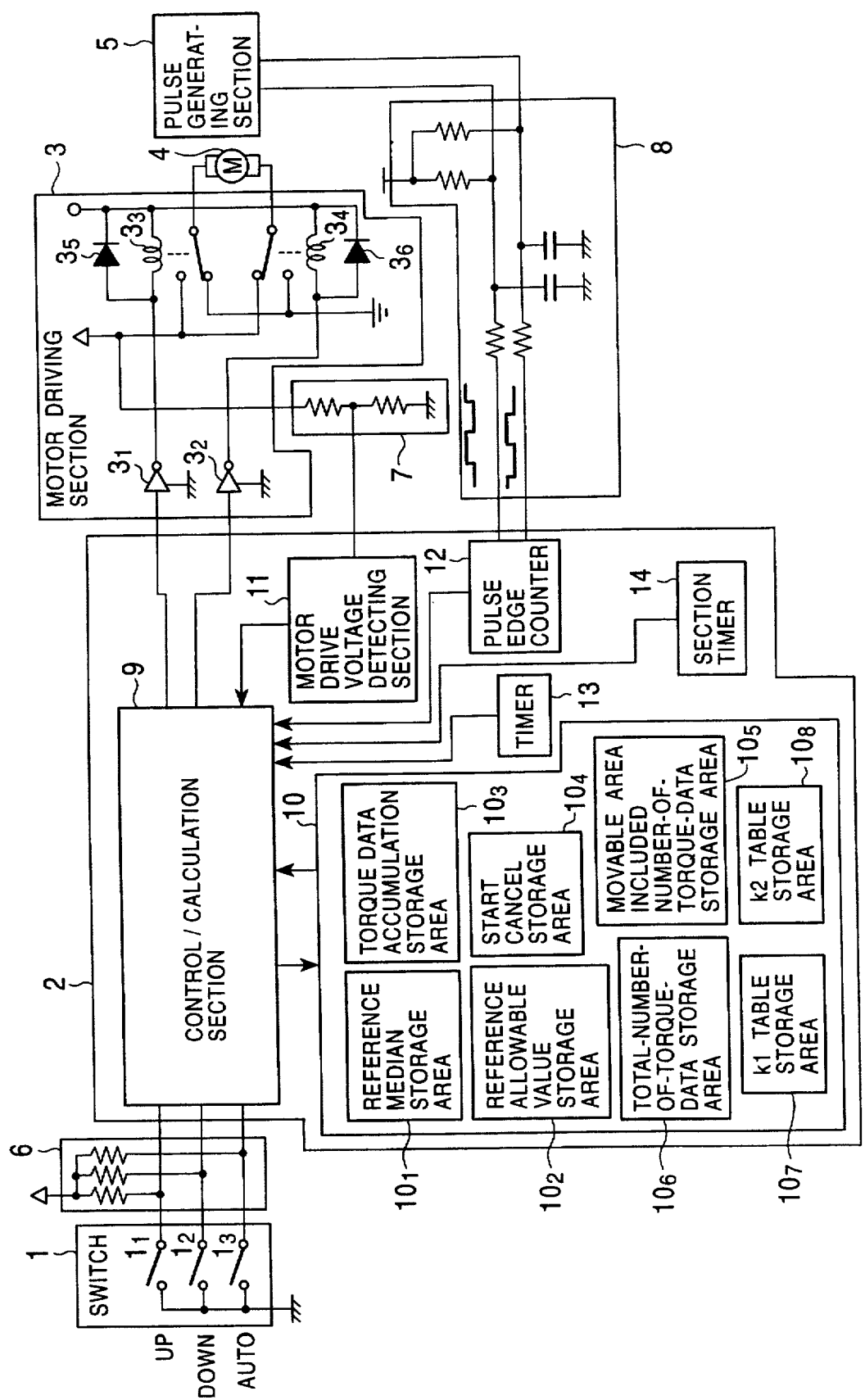
FIG. 1 is a block diagram showing one example of a power window apparatus to which an pinching detecting method for a power window apparatus according to this invention is applicable.

FIG. 1 is a block diagram showing a configuration of a power window apparatus to which a pinching detecting method for a power window apparatus according to this invention is applicable.

As FIG. 1 shows, the power window apparatus is made up of a switch device 1, a micro control unit (MCU) 2, a motor driving (control) section 3, a motor 4, a pulse generator 5, a pull-up resistor 6, a potential division resistor 7, and a pulse transmission path 8.

Figure 2A:
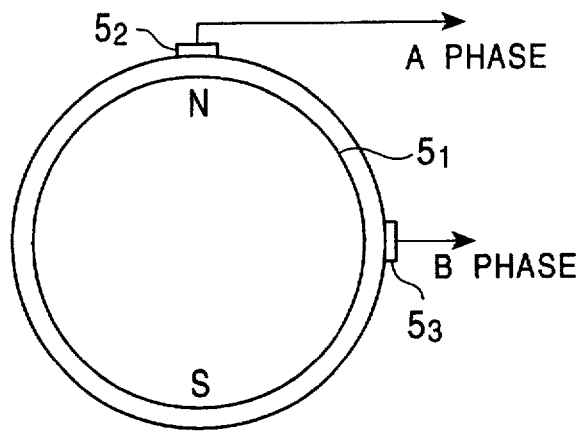
FIG. 2A is an illustration of the principle of a pulse generation of a pulse generator to be used for the power window apparatus shown in FIG. 1.
Figure 2B:
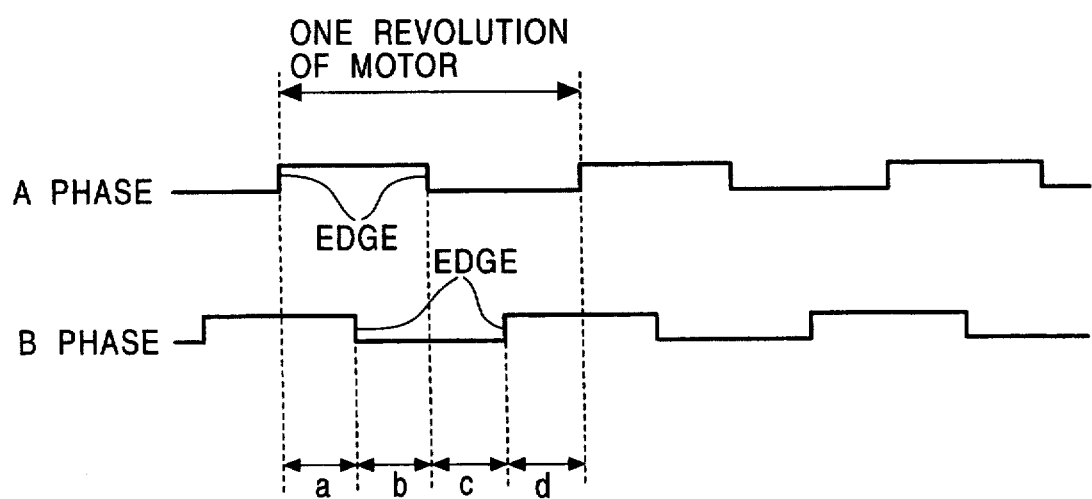
FIG. 2B is an illustration of waveforms of two pulse pulses to be generated from the pulse generator.

FIG. 2A is an illustration of the principle of pulse generation in the pulse generator 5 used in the power window apparatus shown in FIG. 1, while FIG. 2B is an illustration of waveforms of two phase pulses to be generated from the pulse generator 5 during the drive of the motor 4.

As FIG. 2A shows, the pulse generator 5 is composed of a rotor $5_1$ and Hall elements $5_2$ and $5_3$.

Furthermore, the switch device 1 includes a window lifting switch $1_1$, a window lowering switch $1_2$ and an automatically driving switch $1_3$, which are operated independently of each other. The window lifting switch $1_1$ is for issuing a demand for a lifting (closing) operation of the window, the window lowering switch $1_2$ is for issuing a command for a lowering (opening) operation of the window. Only by the operation of the window-lifting switch $1_1$ or the window lowering switch $1_2$, the window is shifted in the specified direction, and on the cease of the operation of the window lifting switch $1_1$ or the window lowering switch $1_2$, the movement of the window comes to an end. The automatically driving switch $1_3$ is for issuing a command for the automatic continuation of the operation, and when the automatically driving switch $1_3$ and the window lifting switch $1_1$ are operated simultaneously, although the window starts the lifting (closing) operation as mentioned above, irrespective of the cease of the operations of the automatic switch $1_3$ and the window lifting switch $1_1$ afterwards, the window lifting (closing) operation continuously takes place, and stops when the window arrives at the uppermost portion of the window frame. On the other hand, on the simultaneous operations of the automatically driving switch $1_3$ and the window lowering switch $1_2$, the window also starts the lowering (opening) operation as stated above, but regardless of the cease of the operation of the automatically driving switch $1_3$ and the window lowering switch $1_2$, the window lowering (opening) operation continuously takes place, and stops when the window reaches the lowermost portion of the window frame.

The micro control unit 2 includes a control/calculation (operation) section 9, a memory 10, a motor drive voltage detecting section 11, a pulse edge counter 12, a first timer 13, and a second timer 14. Of these components, the control/calculation section 9 generates a control signal corresponding to an operating state of the switch device 1 and supplies this control signal through the motor driving section 3 to a motor 4 for driving the motor 4 rotationally. At the same time, the control/calculation section 9 conducts predetermined data processing, data operations or the like on the basis of data fed from the motor drive voltage detecting section 11 or the pulse edge counter 12 or data stored in the memory 10 for controlling the rotating condition of the motor 4 through the motor driving section 3. The memory 10 has eight storage areas, that is, a reference median storage area $10_1$, a reference allowable value storage area $10_2$, a torque data accumulation storage area $10_3$, a start cancel storage area $10_4$, a movable area included number-of-torque-data storage area $10_5$, a total-number-of-torque-data storage area $10_6$, a k1 table storage area $10_7$ and a k2 table storage area $10_8$. A description will be given later of the storage contents in these eight storage areas $10_1$ to $10_8$. The motor drive voltage detecting section 11 is for detecting a divided voltage representative of a voltage of a vehicle-mounted power supply (battery) which develops at the voltage dividing point of the potential division resistor 7. The pulse edge counter 12 is for detecting a pulse edge of two phase pulses fed from the pulse generator 5. The first timer 13 is for measuring a timing at which the pulse edge arrives or for setting a time or measuring a time while the control/calculation section 9 conducts various kinds of data processing, while the second timer 14 is made to be reset whenever a pulse edge arrives at the pulse edge counter 12, and is for setting a pinching decision time reduced from a reference value at that time, that is, a motor torque value forming a decision standard to make a decision as to whether or not a pinching in the window occurs.

When an pinching decision time is taken to be $T_A$, a motor torque constant is taken as Kt, a motor power-generation constant is taken as Ke, a motor drive voltage is taken as E, a motor wirewound resistance is taken as Rm and a reference value is taken as A, an pinching decision time $T_A$ is reduced by the following equation.

$$TA=Kt \cdot Ke/\{(Kt \cdot E)-Rm \cdot A\} \qquad \text{I}$$

A description will be made hereinbelow of a calculation flow corresponding to this equation I.

First, when a motor torque is taken as Tc, a motor torque constant is taken as Kt, a motor power-generation constant is taken as Ke, a motor drive voltage is taken as E, a motor wirewound resistance is taken as Rm and an edge spacing of pulses to be outputted from the pulse generator 5 is taken as Pw, the motor torque Tc is expressed by the following equation, and is a function of the pulse edge spacing Pw.

$$Tc=(Kt/Rm) \cdot \{E-(Ke/Pw)\} \qquad \text{II}$$

Since the relationship between the reference value A (a parameter is a motor torque value) and the pinching decision time $T_A$ is the same as the relationship between the motor torque Tc and the pulse edge interval in the equation II, if the reference value A is substituted for the motor torque Tc in the equation II while the pinching decision time $T_A$ is substituted for the pulse edge interval Pw in the equation II, the equation II results in the above-mentioned equation I.

On the other hand, if the equation II is transformed into the following equation, $$Tc=(Kt \cdot E/Rm)-\{Kt \cdot Ke/Rm \cdot Pw\} \qquad \text{III}$$

and if the use of k1 and k2 takes place for $Kt \cdot E/Rm$ and $Kt \cdot Ke/Rm \cdot Pw$, $$Kt \cdot E/Rm=k1 \qquad \text{IV}$$

$$Kt \cdot Ke/Rm \cdot Pw=k2 \qquad \text{V}$$

then, the equation III becomes $$Tc=k1-k2 \qquad \text{VI}$$

In this equation VI, k1 is a function of the motor drive voltage E, and will be referred to hereinafter as a voltage term of a motor torque Tc, while k2 is a function of the pulse edge interval Pw, and will be referred to hereinafter as a pulse term of the motor torque Tc. The voltage term k1 is stored in the k1 table storage area $10_7$ of the memory 10 installed in the micro control unit 2 as a data table for the variation of the motor drive voltage E, while the pulse term k2 is stored in the k2 table storage area $10_8$ of the same memory 10 as a data table for the variation of the pulse edge interval Pw.

Accordingly, by measuring the motor drive voltage E to obtain the value of the voltage term from the k1 table, by measuring the pulse edge interval PW to derive the value of the pulse term from the k2 table, and finally by subtracting the value of the pulse term from the value of the voltage term, the motor torque Tc is quickly obtained. As stated above, the use of the time tables enables quicker acquisition of the motor torque Tc as compared with the direct calculation thereof according to the equation II.

In addition, the use of the aforesaid time tables enables the calculation of the pinching decision time $T_A$ from the reference value A. since the relationship between the reference value A and the pinching decision time $T_A$ is the same as the relationship between the motor torque Tc and the pulse edge interval Pw, in the equations V and VI, the motor torque Tc is replaced by the reference value A while the pulse edge interval Pw is replaced by the pinching decision time TA, and the k1 table and the k2 table are put to use.

First, the value of the voltage term k1 is derived from the k1 table on the basis of the motor drive voltage E, and the value of the pulse term k2 is calculated on the basis of the reference value A (substituted for Tc) and the voltage term k1 according to the equation VI, and further, the pinching decision time $T_A$ (substituted for the pulse edge interval Pw) is derived from the k2 table.

The motor driving section 3 is composed of two inverters $3_1$ and $3_2$ for control signal inversion, two relays $3_3$ and $3_4$ for switching the rotation of the motor 4 to any one of the forward rotation, the reverse rotation and the stop, and two diodes $3_5$ and $3_6$ for prevention of the occurrence of sparking, and drives the motor 4 rotationally in accordance with a control signal supplied from the micro control unit 2.

A rotary shaft of the motor 4 is connected through a window driving mechanism to a window of a motor vehicle (not shown); for example, with the window being opened by the forward rotation of the motor 4 while being closed by the reverse rotation thereof.

The pulse generator 5 is mounted directly on the motor. That is, it is set on the rotary shaft of the motor as shown in FIG. 2A, and is composed of a rotor $5_1$ in which its circumferential portions being in opposed relation to each other are magnetized into an S-pole and an N-pole, and Hall elements $5_2$ and $5_3$ disposed in the vicinity of the circumference of the rotor $5_1$ to generate two phase pulses (a two-phase pulse signal) different in phase by 90 degrees from each other during the rotation of the motor 4. In connection to the rotation of the motor 4, the rotor $5_1$ rotates concurrently and, as shown in FIG. 2B, the two Hall elements $5_2$ and $5_3$ sense the magnetized portions of the rotor $5_1$ to output two phase pulses shifted ¼ cycle from each other, whose one cycles (periods) coincide with one revolution of the motor 4.

The pull-up resistor 6 is composed of three resistors connected in parallel with each other and connected among the output of the switch device 1, the input of the micro control unit 2 and an 8V power supply (for example, 8V), and is made to supply power supply voltage (8V) to the input of the micro control unit 2 at the time of no operations of the window lifting switch $1_1$, the window lowering switch $1_2$ and the automatically driving switch $1_3$.

The potential division resistor 7 is composed of two resistors connected in series and placed between the vehicle mounted power supply (battery) and the ground, and the junction between these resistors is in connection with the motor drive voltage detecting section 11 of the micro control unit 2.

The pulse transmission path 8 is made up of two pull-up resistors connected between the output of the pulse generator 5 and the power supply (for example, 8V), a capacitor connected between the output of the pulse generator 5 and the ground, and two series resistors connected between the output of the pulse generator 5 and the input of the pulse edge counter 12 of the micro control unit, and is made to transmit two phase pulses, outputted from the pulse generator 5, to the pulse edge counter 12.

When the motor 4 is put in rotation so that the window is on the opening/closing operation, the two phase pulses generated from the pulse generator 5 go through the pulse transmission path 8 to the micro control unit 2. At this time, the pulse edge counter 12 detects the respective pulse edges (leading and trailing edges) of the two phase pulses and supplies an edge detection signal to the control/calculation section 9 whenever a pulse edge arrives thereat. The control/calculation section 9 counts a supply timing of the pulse edge detection signal through the use of the timer 13 to measure an arrival time interval between one pulse edge detection signal and one pulse edge detection signal subsequent thereto (which will be referred to hereinafter as pulse edge interval data). Incidentally, this pulse edge interval is obtained whenever the motor 4 rotates by ¼.

Meanwhile, in the power window apparatus shown in FIG. 1, the pinching decision time is set for detecting the occurrence/no occurrence of pinching in the window, and the pinching decision time is calculated on the basis of a reference value expressed by a motor characteristic value, concretely by a motor torque value at the window opening/closing operation. The motor torque value is calculated on the basis of the aforesaid pulse edge interval data. Additionally, this motor torque value actually contains the weight of the window, the frictional force between the window and the chassis, and other factors. Still additionally, in the power window apparatus shown in FIG. 1, the entire movable region (the effective movable range between the fully opened position and the fully closed position) is divided into a plurality of movable areas on the basis of the count value counted up whenever the pulse edge interval data arrives, and a reference value is set previously for each of the movable areas.

Figure 3:
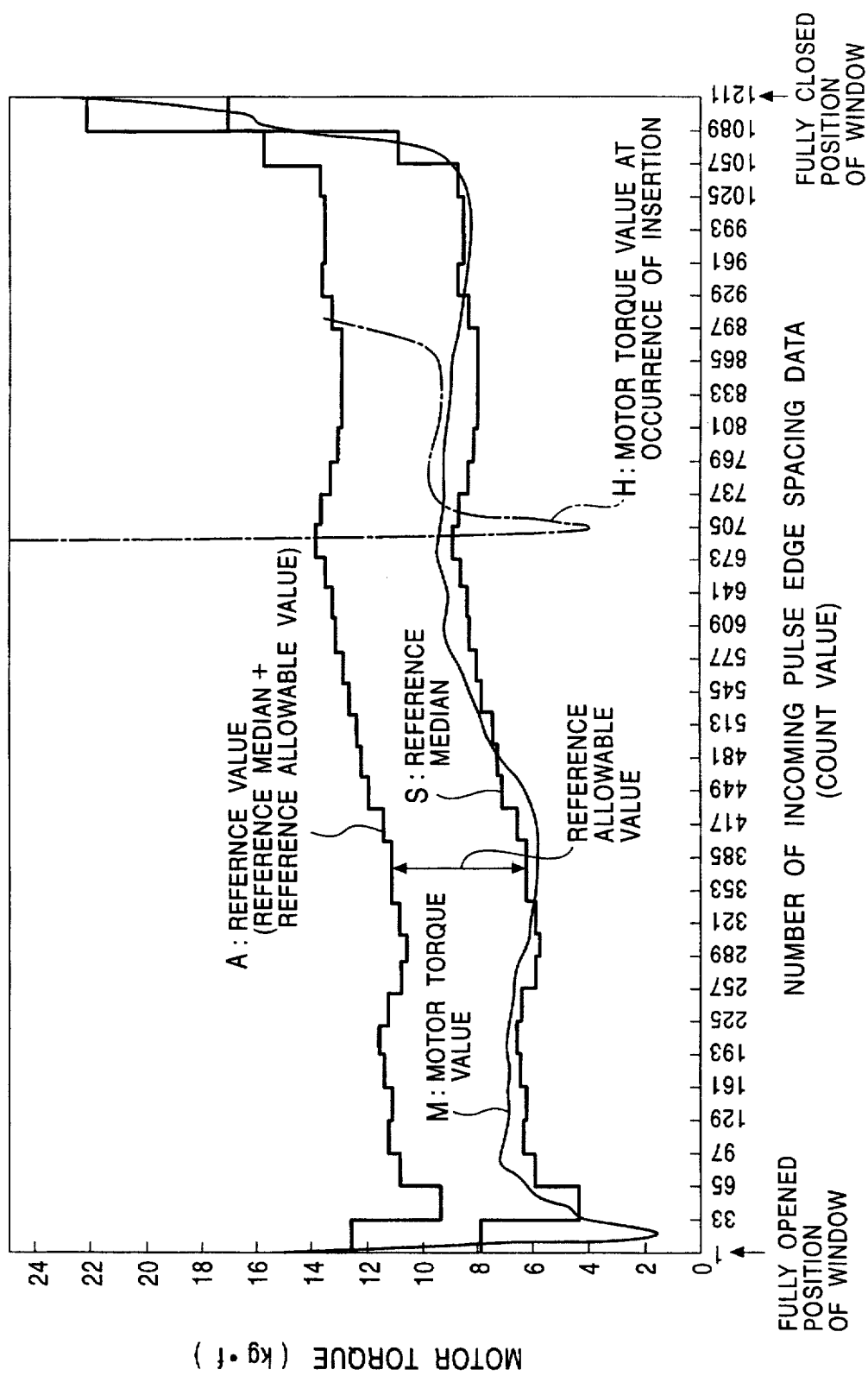
FIG. 3 is a characteristic view showing, in the case in which the whole window movable region of the power window apparatus of FIG. 1 is divided into 36 movable areas, examples of reference medians of the motor torque values and reference allowable value for the motor torque values set in the respective movable areas.

FIG. 3 is a characteristic view showing, in the case in which the whole movable region of the window of the power window apparatus of FIG. 1 is divided into 36 movable areas, an example of a reference value for the motor torque set in each of the movable ares as In FIG. 3, the vertical axis represents a motor torque while the horizontal axis depicts a count value counted up whenever the pulse edge interval data arrives in the case that the window advances from the fully opened position to the fully closed position. In this illustration, a lower side stepwise characteristic S shows a reference median of a motor torque value, an upper side stepwise characteristic A indicates a reference value (reference median+reference allowable value) for a motor torque, a solid line M represents a curve representative of the variation of the motor torque in the case in which the pinching of an object into the window does not occur, and a chain line H denotes represents a curve representative of the variation of the motor torque in the case in which the pinching of an object in the window occurs.

In FIG. 3, the reference median of the motor torque is a motor torque value to be needed for the movement of the window when no substantial pinching in the window occurs, and is determined on the basis of a motor torque value measured at no pinching therein. The reference median is updated to a new reference median whenever the window moves, that is, the reference median is set through so-called learning. Additionally, the motor torque is calculated on the basis of the pulse edge interval data or the motor drive voltage as will be described herein later, while the pulse edge interval data is obtained whenever the motor 4 rotates by ¼, and when the window is shifted from the fully opened position to the fully closed position. That is, when it passes through the 36 movable areas, 32 pulse edge interval data is obtained in each of the movable areas. Thus, about 1200 pulse edge interval data are collected in total and, accordingly, the same number of motor torque data are obtainable.

Furthermore, the reference allowable value on the motor torque indicated in FIG. 3 assumes a constant value regardless of the positions of the movable areas, and is generally determined according to a standard or the like. For example, the maximum allowable force to be exerted on an object pinched in the window is converted into a motor torque which in turn, is used as the reference allowable value, or a value obtained by making some correction on this motor toque value is employed as the reference allowable value. The reference value is obtained by adding the reference allowable value to the reference median, and a decision on the pinching is made on the basis of whether or not a pulse is detected within the pinching decision time obtained by converting this value and the present reference value into a pulse edge spacing.

In the power window apparatus shown in FIG. 1, the following operation is conducted in outline.

In response to the operation of one switch of the switch device 1, for example, on the operation of the window lifting switch $1_1$, the input of the micro control unit 2 connected to the window lifting switch $1_1$ turns from the 8V potential to the ground potential. At this time, the control/calculation section 9 of the micro control unit 2 supplies a control signal to the motor driving section 3 in response to the ground potential inputted for the rotation of the motor 4 in the forward direction. In accordance with the control signal therefrom, the motor driving section 3 implements the switching between the two relays $3_3$ and $3_4$ to rotate the motor 4 in the forward direction. The forward rotation of the motor 4 causes the movement of the window in the closing direction by means of the window driving mechanism linked to the motor 4. Additionally, the rotation of the motor 4 causes the pulse generator 5 set in the motor 4 to generate two phase pulses which, in turn, enter the pulse edge counter 12 of the micro control unit 2 through the pulse transmission path 8.

On the cease of the operation of the window lifting switch $1_1$, the input of the micro control unit 2 connected to the window lifting switch $1_1$ turns from the ground potential to the 8V potential. At this time, in response to the inputted 8V potential, the control/calculation section 9 supplies a control signal to the motor driving section 3 for the stop of the rotation of the motor 4, and the motor driving section 3 performs the switching between the two relays $3_3$ and $3_4$ to cease the supply of power to the motor 4 to stop the rotation of the motor 4. The stop of the rotation of the motor 4 leads to the stop of the window driving mechanism linked to the motor 4 so that the window stays at the present position. Additionally, the stop of the rotation of the motor 4 causes the pulse generator 5 set in the motor 4 to cease the generation of the two phase pulses so that no supply of the two-phase pulses to the pulse edge counter 12 takes place.

Thereafter, by the operation of another switch of the switch device 1, for example, the window lowering switch $1_2$, the input of the micro control unit 2 connected to the window lowering switch $1_2$ turns to the ground potential. At this time, due to the inputted ground potential, the control/calculation section 9 of the micro control unit 2 supplies a control signal to the motor driving section 3 for the reverse rotation of the motor 4, and in response to this control signal, the motor driving section 3 conducts the switching between the two relays $3_3$ and $3_4$ to rotate the motor 4 in the reverse direction. The reverse rotation of the motor 4 causes the movement of the window in the opening direction by the driving mechanism linked to the motor 4. Also in this case, the rotation of the motor 4 causes the pulse generator 5 attached to the motor 4 to generate two phase pulses, with the two phase pulses generated being fed through the pulse transmission path 8 to the pulse edge counter 12.

Following this, when the operation of the window lowering switch $1_2$ is ceased, the input of the micro control unit 2 connected to the window lowering switch $1_2$ is changed from the ground potential to the 8V potential. At this time, due to the inputted 8V potential, the control/calculation section 9 supplies a control signal to the motor driving section 3 for the stop of the rotation of the motor 4, and in response to this control signal, the motor driving section 3 switches between the two relays $3_3$ and $3_4$ to cut off the supply of power to the motor 4 for stopping the rotation of the motor 4. On the stop of the rotation of the motor 4, the window driving mechanism linked to the motor 4 stops so that the window stays at the present position. Additionally, the stop of the rotation of the motor 4 causes the stop of the generation of the two phase pulses from the pulse generator 5 attached to the motor 4 so that no supply of the two phase pulses to the pulse edge counter 12 takes place.

Furthermore, in the case in which the window lifting switch $1_1$ and the automatically driving switch $1_3$ are operated concurrently or the window lowering switch $1_2$ and the automatically driving switch $1_3$ are operated simultaneously, an operation substantially similar to the above-described operations takes place.

Referring here to the flow charts of FIGS. 4 to 6, a detailed description will be given of the operations of the power window apparatus shown in FIG. 1.

First of all, in a step S1, the control/calculation section 9 of the micro control unit 2 makes a decision as to whether any one of the window lifting switch $1_1$, the window lowering switch $1_2$ and the automatically driving switch $1_3$ of the switch device 1 is operated (pressed) or not. If a decision (Y) is made to the operation of any one of the switches $1_1$, $1_2$ and $1_3$, the operational flow advances to the next step S2. On the other hand, if a decision (N) is made to no operation of any one of the switches $1_1$, $1_2$ and $1_3$, the processing of this step S1 is conducted repeatedly.

In the step S2, the control/calculation section 9 abandons the count contents of the pulse edge counter 12 and initializes it.

In a step S3, the control/calculation section 9 sets an initial time in the second timer 14. This initial time is set to be considerably longer than a time to be set in the second timer 14 afterwards.

In a step S4, the control/calculation section 9 drives the motor 4 through the motor driving section 3 to start the motor 4.

In steps S5 and S6, the control/calculation section 9 makes a decision on whether or not the first pulse edge of two phase pulses supplied from the pulse generator 5 is detected in the pulse edge counter 12 within the time set in the second timer 14. If a decision (Y) is made to the detection of the first pulse edge, the next step S7 follows. On the other hand, if a decision (N) is made that the first pulse edge is not detected yet, the steps S5 and S6 are implemented repeatedly. If the decision (Y) of the step S5 shows that the set time of the second timer 14 elapses, the operational flow goes to a step S26.

These steps S5 and S6 are for confirming, through the detection of the first pulse edge, whether or not the motor 4 starts rotation after the depression of the switch 1, and by the confirmation of the first pulse edge, it is possible to decide that the motor 4 starts rotation normally. If the first pulse edge is not confirmed within the set time of the second timer 14, it is considered that the motor 4 does not start rotation or that some trouble occurs in the power window apparatus, so that the operational flow goes to the step S26.

In steps S7 and S8, the control/calculation section 9 makes a decision on whether or not the pulse edge counter 12 detects the next pulse edge of the two phase pulses supplied from the pulse generator 5. If a decision (Y) is made that the next pulse edge is detected within the set time of the second timer 14, the operational flow proceeds to a step S9 in FIG. 5. On the other hand, a decision (N) is made that the next pulse edge is not detected yet, the steps S7 and S8 are implemented repeatedly. If the answer of the step S7 indicates that the set time of the second timer 14 elapses, the operational flow goes to the step S26.

These steps S7 and S8 are for confirming, through the detection of the next pulse edge, that the motor 4 rotates continuously. The confirmation of the next pulse edge permits the decision that the motor 4 rotates continuously. If the next pulse edge is not confirmed within the set time of the second timer 14, there is a possibility of the occurrence of a pinching, and the operational flow goes to the step S26.

In a step S9, when the pulse edge counter 12 detects the pulse edge, the control/calculation section 9 obtains pulse edge interval data representative of a pulse edge interval between the previous pulse edge and the present pulse edge from the count value of the first timer 13.

In a step S10, the control/calculation section 9 makes a decision on whether or not the obtained pulse edge interval data exceeds a prescribed time (for example, 3.5 msec), that is, whether it is normal pulse edge interval data or a noise. If a decision (Y) is made that the pulse edge interval data exceeds the prescribed time, the operational flow goes to a step S11 in FIG. 5.

In a step S11, the control/calculation section 9 decides whether an operation at the start of the motor 4 is completed or not, that is, whether the cancel at the start is completed or not. If a decision (Y) is made to the completion of the operation at the start, the next step S12 follows. On the other hand, if a decision (N) is made that the operation at the start is not completed yet, the operational flow goes to a different step S29.

In a step S12, the control/calculation section 9 takes, as a motor drive voltage E, a divided voltage by the potential division resistor 7, detected in the motor drive voltage detecting section 11.

In a step S13, the control/calculation section 9 gains access to the k1 table storage area $10_7$ of the memory 10 to obtain k1 corresponding to the motor drive voltage E detected in the step S12.

In a step S14, the control/calculation section 9 calculates the motor torque pulse term k2 on the basis of the k1 data obtained in the step S13 and a reference value of the motor torque according to the above-mentioned equation V.

In a step S15, the control/calculation section 9 gains access to the k2 table storage area $10_8$ of the memory 10 to obtain a pinching decision time $T_A$ corresponding to the motor torque pulse term k2 calculated in the step S14.

In a step S16, the control/calculation section 9 immediately sets the pinching decision time $T_A$, obtained in the step S15, in the second timer 14 whenever one pulse edge is detected.

Figure 6:
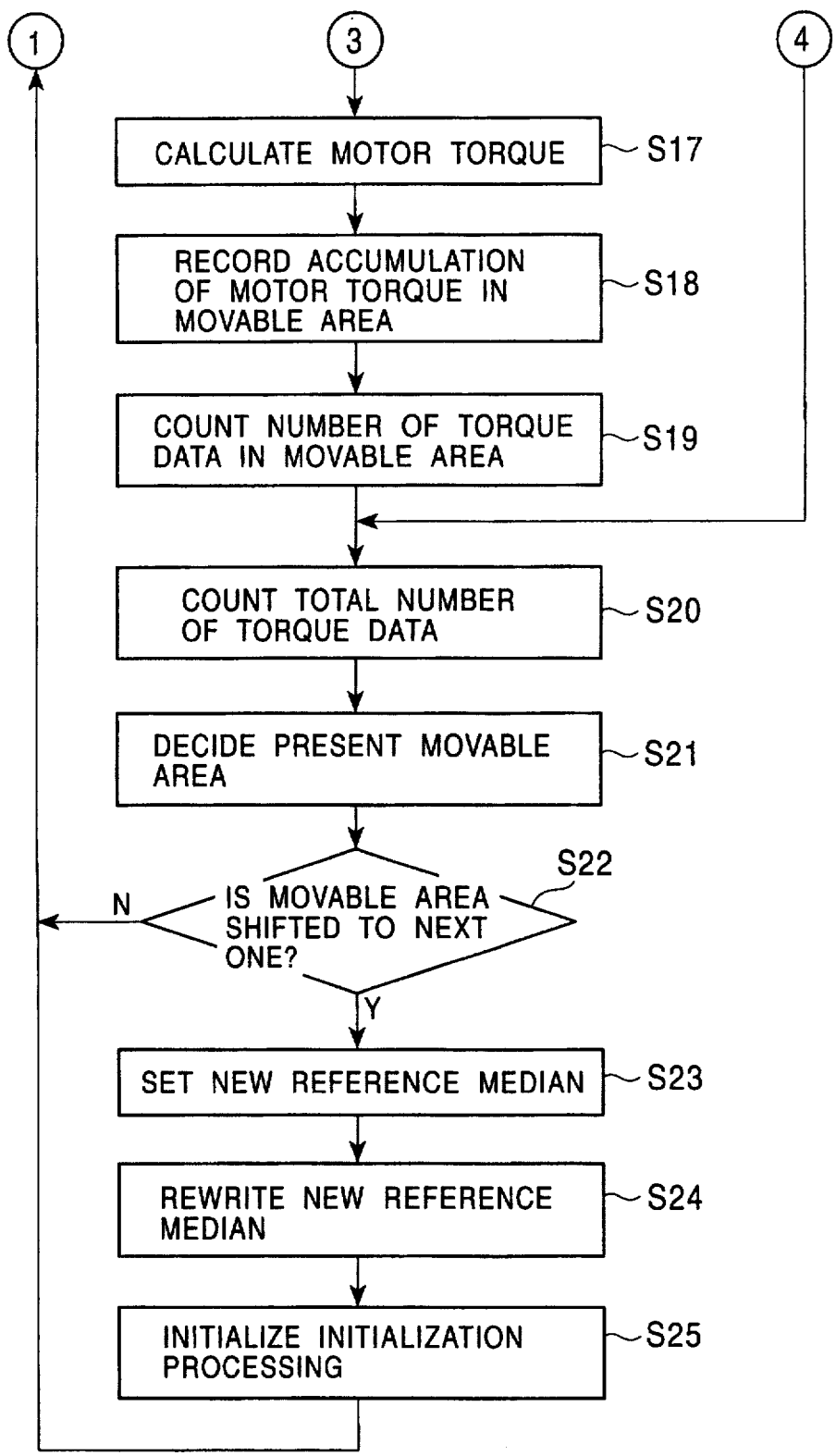
FIG. 6 is an illustration of a remaining portion of the flow chart showing the detailed operation including the detection of pinching into the window during the operation of the power window apparatus of FIG. 1.

In a step S17 in FIG. 6, the control/calculation section 9 calculates a motor torque Tc on the basis of the obtained motor drive voltage E and the obtained pulse edge interval data Pw through the use of the k1 table and the k2 table mentioned above.

In a step S18, the control/calculation section 9 accumulatively stores the motor torque data in the torque data accumulation storage area $10_3$ of the memory 10 for obtaining the sum of all the motor torque values detected on the movable areas during the movement of the window.

In a step S19, the control/calculation section 9 adds 1 to the number of torque data of a movable area stored on the movable area included number-of-torque-data storage area $10_5$ of the memory 10 for counting the number of motor torque detected on the movable area in which the window is on the movement, and stores the addition result therein.

In a step S20, the control/calculation section 9 adds 1 to the total number of torque data stored in the total-number-of-torque-data storage area $10_6$ of the memory 10 for counting the total number of all the motor torque values obtained between the fully opened position of the window and the present movable area in which the window is on the movement, and stores the addition result therein.

In a step S21, the control/calculation section 9 judges, on the basis of the total number of torque data stored in the total-number-of-torque-data storage area $10_6$, the movable area in which the window exists currently.

In a step S22, the control/calculation section 9 judges, on the judgment in the step S21, whether or not the window shifts from one movable area forming the present movable area to the next movable area. If a decision (Y) is made that the window shifts to the next movable area, the operational flow advances to a step S23. On the other hand, if a decision (N) is made that the window does not shift to the next movable area yet, the operational flow returns to the previous step S7 to conduct the operations from the step S7 repeatedly.

In a step S23, the control/calculation section 9 sets a new reference median for the last movable area on the basis of the motor torque values obtained on the last movable area. This setting of the new reference median is made using the average value of the obtained motor torque values. That is, the control/calculation section 9 reads out the accumulated torque data stored from the torque data accumulation storage area $10_3$ of the memory 10 and further reads out the number of the in-movable-area torque data stored from the movable area included number-of-torque-data storage area $10_5$, and divides the read accumulated torque data by the read number of the in-movable-area torque data, thereby obtaining the motor torque average value.

In a step S24, the control/calculation section 9 writes the reference median set newly in the step S23 in the reference median storage area $10_1$ of the memory 10 in place of the reference median written so far therein.

In a step S25, the control/calculation section 9 initializes the torque data accumulation storage area $10_3$ and the movable area included number-of-torque-data storage area $10_5$ of the memory 10 which have been used for the acquisition of the motor torque average value. After the initialization, the operational flow returns to the preceding step S7 to conduct the operation from the step S7 repeatedly.

The steps S18 to S25 are for updating the reference median through learning. Such a repeating operation in the flow chart is conducted until the movement of the window stops due to the stop of the drive of the motor 4 caused by the cease of the operation of the window lifting switch $1_1$, the window lowering switch $1_2$ or the like, until the movement of the window stops due to the stop of the motor 4 in the step S28 resulting from the detection of pinching in the window as will be described herein later, or until the motor 4 is driven rotationally in the reverse direction to move the window in the opposite direction due to the detection of the pinching in the window.

The steps S3 to S5 and the steps S26 to S28 are for detecting the trouble of the apparatus immediately after the depression of the switch 1 or the occurrence of the pinching. That is, in these steps, the control/calculation section 9 monitors whether or not the motor 4 starts rotation within the pinching decision time set in the second timer 14 after the depression of the switch 1. If the motor 4 does not start rotation within this time, the control/calculation section 9 confirms that the window is in the fully opened condition or the fully closed condition, namely, that further movement of the window is impossible, and, if the window is not in the fully opened condition or the fully closed condition, decides that some trouble occurs in the power window apparatus or that pinching has occured, and conducts the corresponding processing. Among the types of the trouble in the power window apparatus, there may be no rotation of the motor 4 due to the malfunction of the motor driving section 3, the malfunction of the pulse generator 5 or the pulse transmission path 8, and others.

In the step S5, after the detection of the first pulse edge, the control/calculation section 9 makes a decision as to whether or not the pinching decision time set in the second timer 14 elapses. If a decision (Y) is made to the elapse of the pinching decision time, the next step S26 follows.

In the step S26, the control/calculation section 9 judges whether or not the window is at the fully closed position or the fully opened position. If the judgment (Y) shows that the window is at the fully closed position or the fully opened position, a decision is made that the stop of the window is caused by the arrival at the fully closed position or the fully opened position, and the next step S27 follows. On the other hand, if the judgment (N) indicates that the window is out of the fully closed position or the fully opened position, another step S28 follows.

In the step S27, the control/calculation section 9 supplies a drive stopping signal to the motor driving section 3 for stopping the drive of the motor 4. At the same time, the control/calculation section 9 stops the time-measuring operation of the second timer 14, thus terminating this series of operations.

If the judgment of the step S26 indicates that the window is not in the fully closed position or the fully opened position, it is considered that a pinching has occured at the time of the depression of the switch 1 or that a trouble arises in the power window apparatus; therefore, in the step S28, the control/calculation section 9 supplies a drive signal to the motor driving section 3 to drive the motor 4 in the window opening direction, thereafter terminating this series of operations.

The steps S7, S8 and S26 to S28 are for detecting the occurrence of a pinching while the window is in on the movement, and for conducting the processing.

In the steps S7 and S8, the control/calculation section 9 judges whether or not the next pulse edge is detected within the set time of the second timer 14. If the judgment (Y) indicates the elapse of the time set in the second timer 14, the step S26 follows. On the other hand, if the judgment (N) indicates that the time set in the second timer 14 has not elapsed yet, the operational flow returns to the step S7 to conduct the operations from the step S7 repeatedly.

As mentioned above, in the step S26, the control/calculation section 9 judges whether or not the window is at the fully closed position or the fully opened position, and if the judgment (Y) of the step S26 indicates that the window is at the fully closed position or the fully opened position, the step S27 follows to supply the drive stopping signal to the motor driving section 3 for stopping the drive of the motor 4, then terminating this series of operations. On the other hand, if the judgment (N) indicates that the window is not at the fully closed position nor the fully opened position, a decision is made that pinchinf in window has occurred and the next step S28 is put in implementation.

In the step S28, for releasing from this pinching state, the control/calculation section 9 supplies a drive signal to the motor driving section 3 for a short time, for example, for 500 msec, to drive the motor 4 in the window opening direction, then terminating this series of operations.

If the judgment (N) of the step S11 indicates that the operation at the start does not come to a completion yet, the operational flow goes to another step S29 where the control/calculation section 9 calculates a multiple of the pulse edge interval obtained in the step S9, for example, 1.5 times of the pulse edge interval.

Subsequently, the operational flow goes to a step S30, where the control/calculation section 9 sets immediately a time corresponding to 1.5 times of the last pulse edge interval calculated in the step S29 in the second timer 14. Following this, the operational flow proceeds to the step S20.

Figure 4:
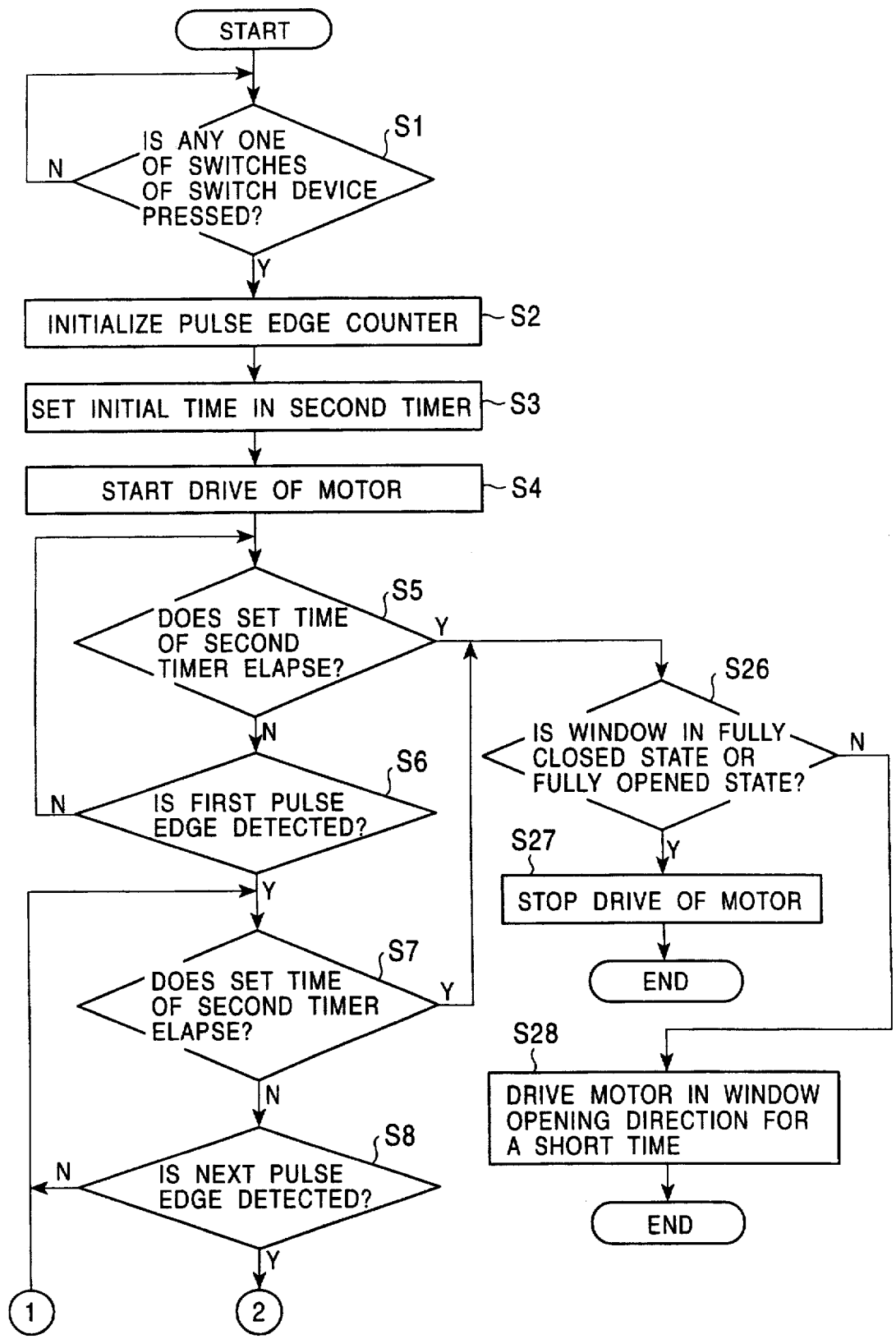
FIG. 4 is an illustration of a portion of a flow chart showing a detailed operation including a detection of pinching into a window at the time of an operation of the power window apparatus of FIG. 1.
Figure 5:
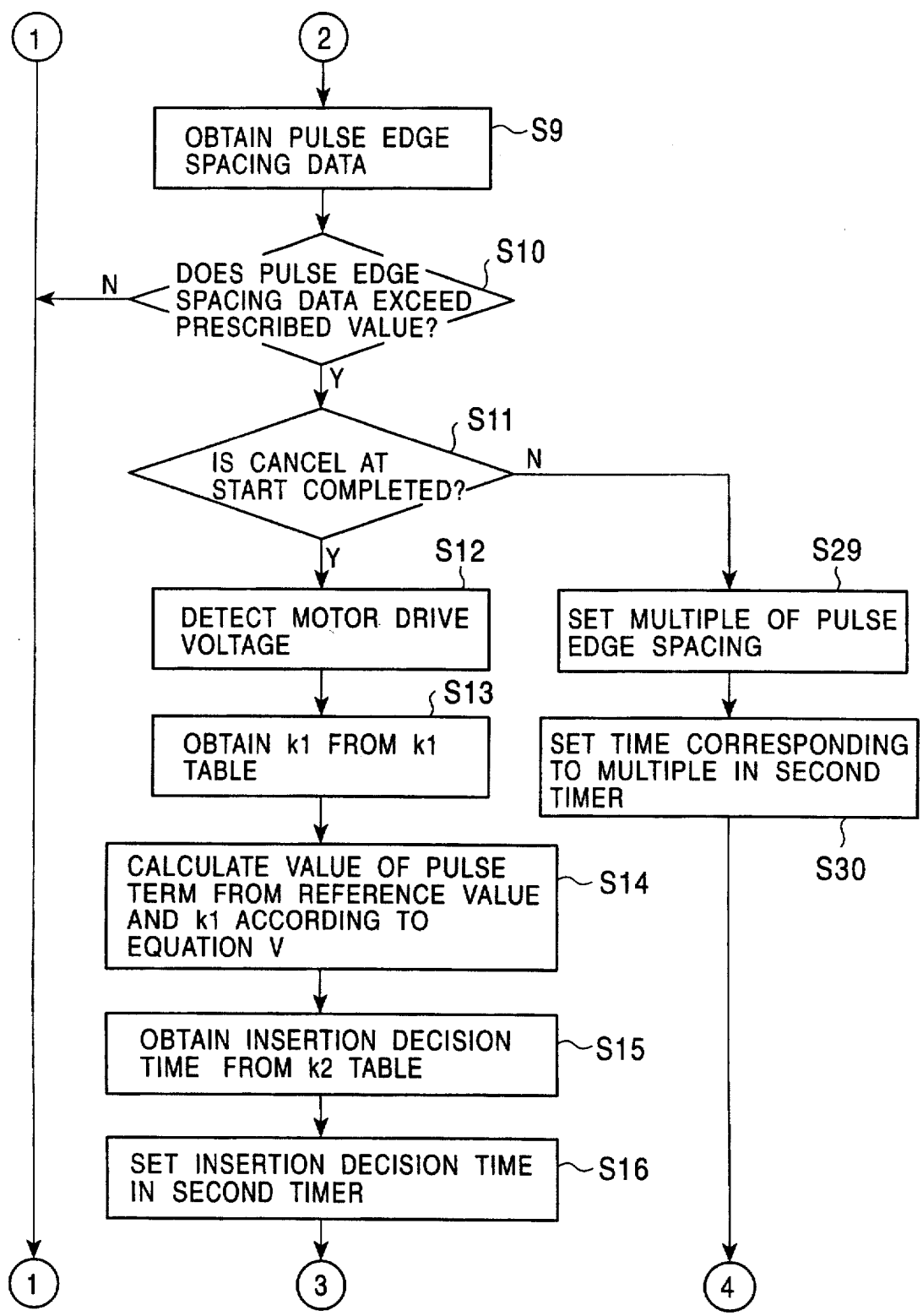
FIG. 5 is an illustration of a second portion of the flow chart showing the detailed operation including the detection of pinching into the window during the operation of the power window apparatus of FIG. 1.

As described above, with the pinching detecting method for a power window apparatus according to this embodiment, in the operations according to the flow charts of FIGS. 4 to 6, the window is moved from the fully opened position to the fully closed position, and if pinching in the window does not occur during the movement thereof, a characteristic indicated by a solid line M in FIG. 3 is presented as a motor torque value, and throughout the entire movable region of the window, the motor torque value does not exceed the reference value set in each of the movable areas.

On the contrary, in a case where the window is moved from the fully opened position to the fully closed position and a pinching in the window occurs during the movement thereof, a characteristic indicated by a chain line H in FIG. 3 is presented as a torque value, and the motor torque value in the movable area where the pinching occurs rises to the reference value set on that movable area. However, with the above-described pinching detecting method for a power window apparatus according to this embodiment, the pinching decision time $T_A$ reduced from the reference value A is set in the second timer 14 placed in the micro control unit 2 whenever one pulse edge of pulses outputted from the pulse generator 5 arrives, and at the elapse of the pinching decision time $T_A$ set in the second timer 14, that is, at the time that the a motor torque corresponding to the reference value A acts on the objected pinched, the control/calculation section 9 supplies a control signal to the motor driving section 3 to conduct the switching between the two relays $3_3$ and $3_4$ for stopping the rotation of the motor 4 to stop the movement of the window or for rotating the motor 4 in the direction opposite to the previous direction to move the window in the direction opposite to the previous direction; therefore, an external force exceeding the motor torque corresponding to the reference value A never acts on the inserted object.

In addition, with the pinching detecting method for a power window apparatus according to this embodiment, in the operation according to the flow charts of FIGS. 4 to 6, when some breakdown or malfunction occurs in the pulse generator 5 or the pulse supply path so that the pulse edge interval becomes larger than a prescribed pulse edge interval, the control/calculation section 9 immediately stops the drive of the window; hence, a mistaken decision indicating the detection of the occurrence of the pinching is not made when, in fact, pinching in the window does not occur.

As one exemplification, a two-phase pulse signal (two phase pulses) and a time setting condition in the second timer in the power window apparatus shown in FIG. 1 will be described hereinbelow with reference to FIG. 7.

Figure 7:
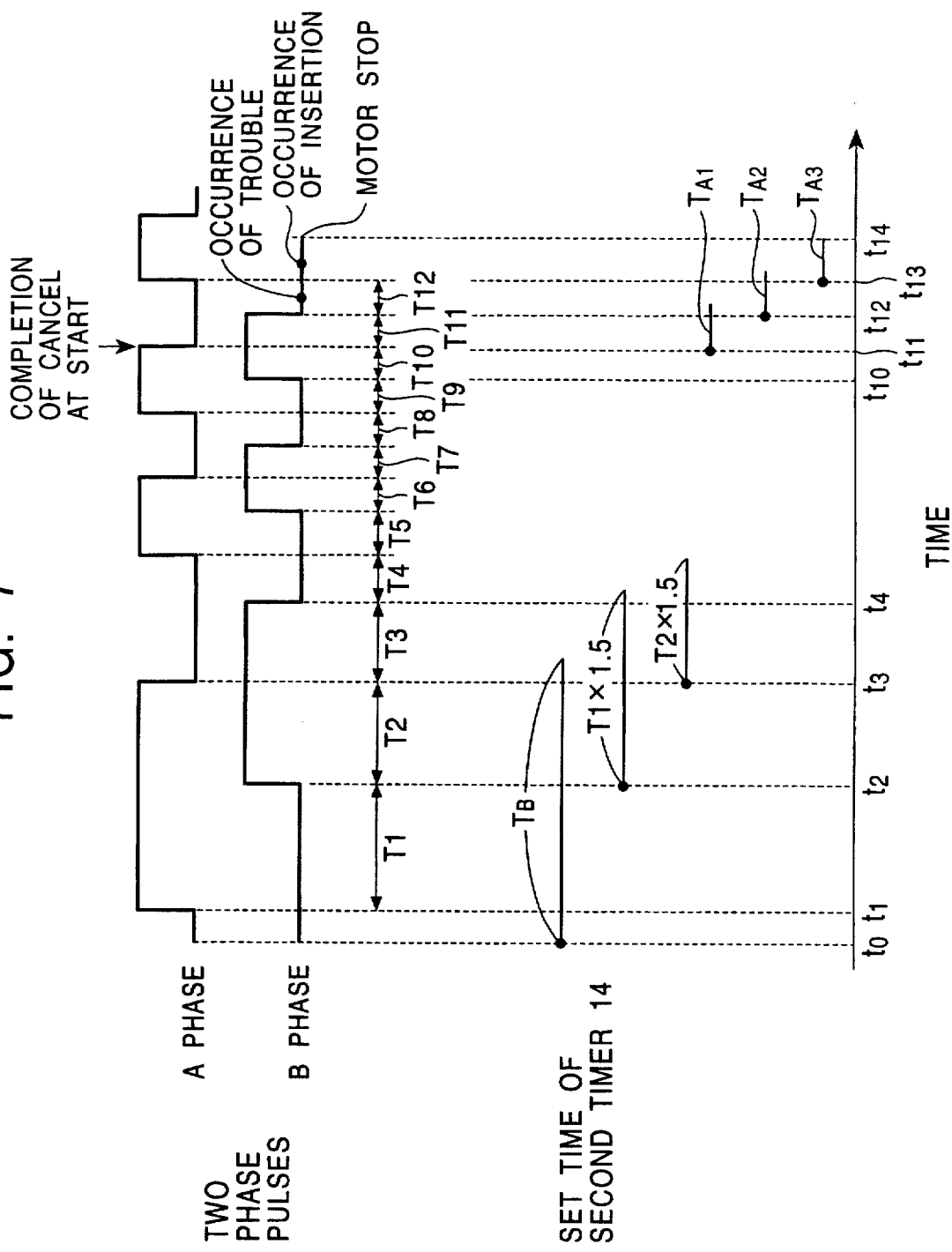
FIG. 7 is an illustration useful for explaining examples of two phase pulses and a time setting condition in a second timer in the power window apparatus of FIG. 1.

In FIG. 7, the horizontal axis represents a time, while the upper side waveforms designate two phase pulses to be generated from the pulse generator 5 and the lower side horizontal lines denote set time periods in the second timer 14.

First, the time signifies the point of time that the second timer 14 is set in the step S3 of the aforesaid flow chart, and the motor 4 is simultaneously started so that the pulse generator 5 gets into an activating condition. At this time, set in the second timer 14 is a relatively long time, for example, a time period $T_B$ from the time $t_0$ to a time beyond a time $t_3$, which will be mentioned later, to be taken in the normal operating condition. This is because the start of the motor 4 relatively takes time and a long time is taken before the generation of the first pulse.

Following this, when a time $t_1$ is reached, an A-phase pulse of the two phase pulses develops so that the first pulse edge arrives. The detection of this pulse edge is performed in the step S6 of the aforesaid flow chart.

When the time passes from the time $t_1$ through a time period T1 to a time $t_2$, a B-phase pulse of the two phase pulses develops so that the next pulse edge arrives, with the next pulse edge being detected in the step S6 of the flow chart. At this time, in the step S29, a time period (T1×1.5) forming 1.5 times the time period T1 is set in the second timer 14.

In the case in which the first pulse edge is not detected within the set time period $T_B$, since it is thought that some trouble occurs in the A-phase portion of the pulse generator 5, that a breakdown exists originally in the circuit, that the window is at the fully opened position or the fully closed position, or that a pinching occurs from the beginning, in the processing from the step S26 of the flow chart, the drive of the motor 4 is stopped or the window is driven in the opening direction. Additionally, in the case in which the first pulse edge is detected but the next pulse edge is not detected within the set time period $T_B$, since it is thought that a failure occurs in the B-phase portion of the pulse generator 5, that the circuit suddenly breaks down, that the window reaches the fully opened position or the fully closed position, or that a pinching occurs, in the processing from the step S26 of the flow chart, the drive of the motor 4 is stopped or the window is driven in the opening direction.

Thereafter, when the time passes from the time $t_2$ through a time period T2 to the time $t_3$, the A-phase pulse of the two phase pulses disappears (falls into a blanking state) so that the third pulse edge arrives. At this time, the time (T2×1.5) equivalent to 1.5 times the time period T2 is set in the second timer 14.

Likewise, until the completion of the cancel at the start, a time period made by multiplying the last pulse edge interval Tn by 1.5 is set in the second timer 14. As described from the description referring to FIG. 7, before the completion of the cancel at the start, since the time period made by multiplying the time period between the last arrival (incoming) pulse edge and the present arrival pulse edge by 1.5 is set in the second timer 14, when the arrival interval between the pule edges of the two phase pulses is relatively long as seen immediately after the start of the motor 4, the time period to be set in the second timer 14 becomes longer, and as the rotation of the motor 4 approaches the steady state, the time period to be set in the second timer 14 becomes shorter. Accordingly, the detection of the pulse edges within this set time period signifies that the pulse generator 5 and the two-phase pulse transmission path 8 are in the normally operating conditions. On the other hand, no detection of the pulse edges signifies the malfunction of the pulse generator 5 or the pulse transmission path 8, and in this case, the processing from the step S29 of the flow chart is conducted. Additionally, also in the case in which, during this time period, the window reaches the fully opened position or the fully closed position or a pinching in the window has occured, the pulse edge is not detected and, likewise, the processing from the step S29 is put in implementation.

When time reaches a time $t_{11}$, an pulse edge forming the trailing edge of the A-phase pulse of the two phase pulses arrives. At this time, if the step S9 of the flow chart judges the completion of the cancel at the start (Y judgment), a pinching decision time $T_{A1}$ at the time $t_{11}$, obtained in the step S15 of the flow chart, is set in the second timer 14.

When time transits from the time $t_{11}$ through a time period T11 to a time $t_{12}$, on the trailing edge of the B-phase pulse of the two phase pulses, a pulse edge arrives. At this time, a pinching decision time $T_{A2}$ at the time $t_{12}$ is set in the second timer 14.

Furthermore, when time transits from the time $t_{12}$ to a time $t_{13}$ after a time period T12, an A-phase pulse of the two phase pulses appears to present a pulse edge forming its leading edge. At this time, a pinching decision time $T_{A3}$ at the time $t_{13}$ is set in the second timer 14.

After the completion of the cancel at the start, the pinching decision time periods $T_{A1}$, $T_{A2}$ and $T_{A3}$ obtained from the motor torque reference values A are set in the second timer 14, while, since the reference value A varies in accordance with the number of incoming pulse edge interval data as obvious from FIG. 3, the pinching decision time periods $T_{A1}$, $T_{A2}$ and $T_{A3}$ vary accordingly whenever an pulse edge arrives.

When the next pulse edge is detected within a pinching decision time $T_{An}$, a decision is made as to no occurrence of a pinching. On the other hand, in the case of no detection of the next pulse edge, a decision is made to the occurrence of the pinching and, hence, the processing from the step S9 of the flow chart is implemented to stop the drive of the motor 4 or to drive the window in the opening direction. In FIG. 7, at the time $t_{13}$ of the detection of the A-phase pulse, the pinching decision time $T_{A3}$ is set in the second timer 14, and if the next B-phase pulse edge is not detected before the pinching decision time $T_{A3}$ elapses, a decision is made that a pinching occurs after the time $T_{13}$, and the motor 4 is stopped or is driven so that the window moves in the opening direction.

Furthermore, when any one of the pulse generator 5 and the two phase pulse transmission path 8 operates abnormally, for example, if some trouble occurs on the B-phase pulse side for the time T12 to make difficult the arrival of the corresponding pulse edge, the time set in the second timer 14 elapses after the elapse of the time period $T_{A3}$ from the time $t_{13}$, that is, within the pulse edge interval from when a pulse edge forming the leading edge of the A-phase pulse arrives until a pulse edge forming the trailing edge of the A-phase pulse arrives. At this time, the control/calculation section 9, when detecting the elapse of the set time of the second timer 14, stops the motor 4 immediately.

Incidentally, although the example shown in FIG. 7 relates to the case in which no arrival of the pulse edge of the B-phase pulse of the two phase pulses occurs, this applies similarly to the case in which no arrival of the pulse edge of the A-phase pulse of the two phase pulses comes about, and further to the case in which no arrival of the pulse edges of the A-phase pulse and the B-phase pulse of the two phase pulses arises.

In addition, in the example shown in FIG. 7, although the time to be set in the second timer 14 before the completion of the cancel at the start is selected to 1.5 times the time interval between the last incoming pulse edge and the present incoming pulse edge, this multiple is not always limited to 1.5, but it is also possible to select an arbitrary multiple in the range from 1.2 to 1.8.

As described above, according to this invention, since a pinching decision time obtained from a reference value is set in a timer incorporated into a micro control unit whenever one pulse edge of pulses outputted from a pulse generator arrives, even in the case in which a high-rigidity object is pinched in a window to lock a motor abruptly so that the next pulse edge comes in the micro control unit, since a motor is stopped or driven immediately in the reverse direction after the elapse of the pinching decision time set in the timer, it is possible to prevent an external force exceeding the motor torque corresponding to the reference value from acting on an object pinched.

Moreover, in the state of no obstruction, since the pinching decision time obtained on the basis of the reference value becomes always longer slightly than a pulse edge interval of pulses to be outputted from the pulse generator, when one pulse edge arrives and an pinching decision time is set and the next pulse edge arrives in the pinching decision time, a timer is reset by the next pulse edge and the next pinching decision time is set to conducts the pinching detection continuously in the power window apparatus.

Still moreover, in the case in which some breakdown or trouble occurs in a pulse signal transmission system from the pulse generator to the micro control unit so that the pulse outputted from the pulse generator is not transmitted to the micro control unit at all, or in the case in which one-phase component of the two phase pulses is not transmitted to the micro control unit, since the set time of the timer is up to stop the motor and to cease the detection of the pinching in the power window apparatus, it is possible to avoid a mistaken decision.

It should be understood that the foregoing relates to only a preferred embodiment of the present invention, and that it is intended to cover all changes and modifications (including change to apparatus claims) of the embodiment of the invention herein used for the purpose of the disclosure, which do not constitute departures from the spirit and scope of the invention.

What is claimed is:

1. An obstruction detecting method for a power window apparatus comprising a motor for opening and closing a window through the use of a window driving mechanism, a motor driving section for driving said motor, a pulse generating section for generating pulses in connection with rotation of the motor, a micro control unit for conducting the entire control and drive processing, a timer and a switch device for conducting opening and closing operations of said window manually, wherein said method comprises the steps of:

a) obtaining by said micro control unit a corresponding pinching decision time from a reference value based upon a characteristic value of said motor;

b) updating a time to be set in said timer whenever a pulse edge of said pulses arrives at said micro control unit;

c) determining that a pinching of a high-rigidity object has occurred in said window when a next pulse edge does not arrive before the elapse of said pinching decision time set in said timer; and d) stopping the driving of said motor or rotating said motor in a reverse direction.

2. An obstruction detecting method for a power window apparatus according to claim 1, wherein said motor characteristic value is based on a pulse edge interval of said pulses.

3. An obstruction detecting method for a power window apparatus according to claim 1, wherein said motor characteristic value is a motor torque value, and a reduction equation for obtaining said corresponding pinching decision time from said reference value is as follows:

$$T_A = Kt \cdot Ke / \{(Kt \cdot E) - Rm \cdot A\}$$

where $T_A$ represents an insertion decision time;

Kt represents a motor torque constant;

Ke represents a motor power-generation constant;

E represents a motor drive voltage;

Rm represents a motor wirewound resistance; and

A represents a reference value.

4. An obstruction detecting method for a power window apparatus according to claim 3, wherein said micro control unit measures said motor drive voltage whenever a pulse edge of said pulses arrives.

5. An obstruction detecting method for a power window apparatus according to claim 3, wherein said micro control unit obtains said reference value by adding a predetermined reference allowable value to a reference median of motor torque obtained on the basis of said motor drive voltage, and updates said reference median, stored in a reference median storage area of a memory said micro control unit has, through learning at every calculation.

6. A power window apparatus comprising a motor for opening and closing a window through the use of a window driving mechanism, a motor driving section for driving said motor, a pulse generating section for generating pulses in connection with rotation of the motor, a micro control unit for conducting the entire control and drive processing, a timer and a switch device for conducting opening and closing operations of said window manually, wherein said micro control unit obtains a corresponding pinching decision time from a reference value based upon a characteristic value of said motor to update a time to be set in said timer whenever a pulse edge of said pulses arrives at said micro control unit, and wherein, when a next pulse edge does not arrive before the elapse of said pinching decision time set in said timer, a determination is made that a pinching of a high-rigidity object has occurred in said window, and stopping the driving of said motor or rotating said motor in a reverse direction.

7. A power window apparatus according to claim 6, wherein said motor characteristic value is based on a pulse edge interval of said pulses.

8. A power window apparatus according to claim 6, wherein said motor characteristic value is a motor torque value, and a reduction equation for obtaining said corresponding pinching decision time from said reference value is as follows:

$$T_A = Kt \cdot Ke / \{(Kt \cdot E) - Rm \cdot A\}$$

where $T_A$ represents an insertion decision time;

Kt represents a motor torque constant;

Ke represents a motor power-generation constant;

E represents a motor drive voltage;

Rm represents a motor wirewound resistance; and

A represents a reference value.

9. A power window apparatus according to claim 8, wherein said micro control unit measures said motor drive voltage whenever a pulse edge of said pulses arrives.

10. A power window apparatus according to claim 8, wherein said micro control unit obtains said reference value by adding a predetermined reference allowable value to a reference median of motor torque obtained on the basis of said motor drive voltage, and updates said reference median, stored in a reference median storage area of a memory said micro control unit has, through learning at every calculation.

* * * * *